April 13, 1937.  E. F. W. ALEXANDERSON ET AL  2,077,196
AIRPLANE LANDING FIELD USING DIRECTIONAL RADIO BEAMS
Filed Dec. 1, 1931  6 Sheets-Sheet 2
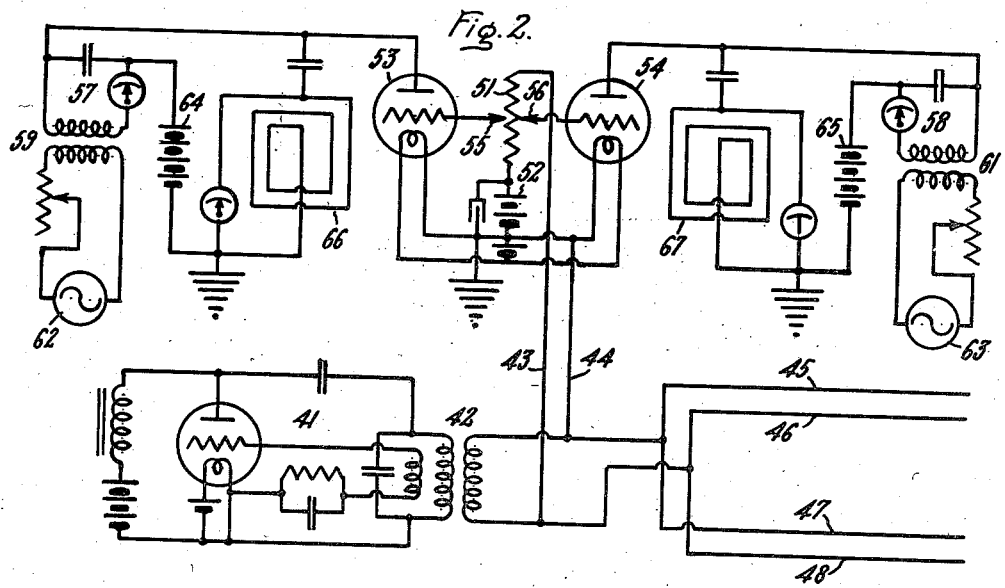
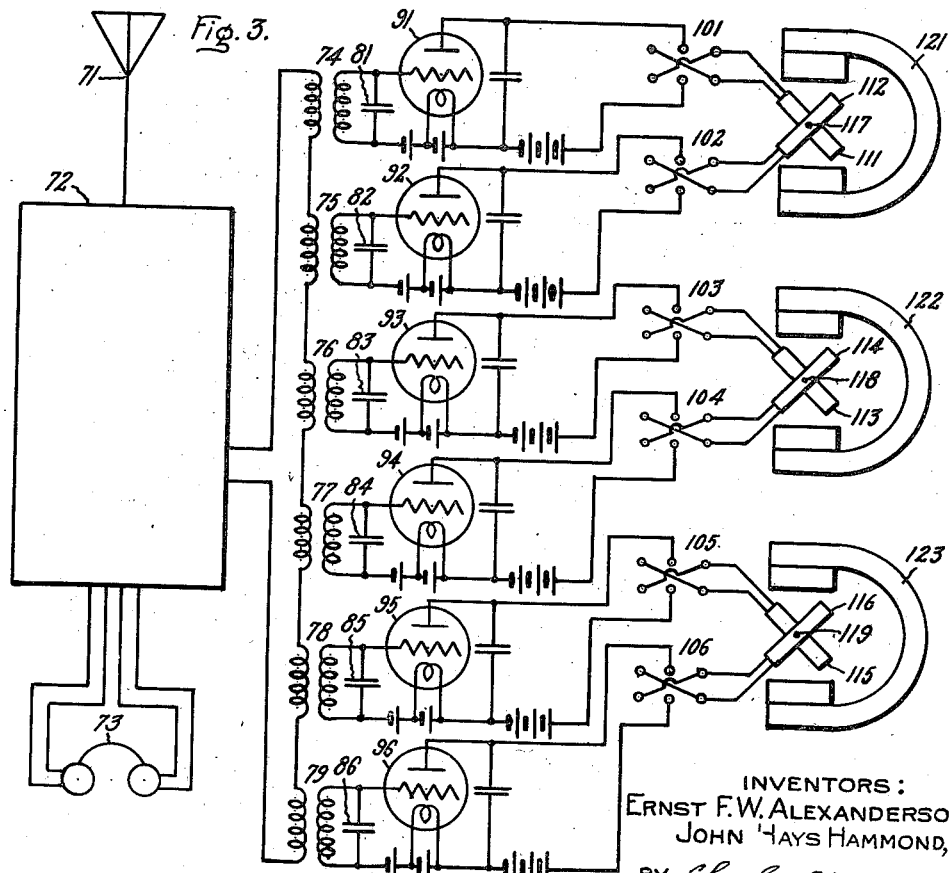
INVENTORS:
ERNST F. W. ALEXANDERSON,
JOHN HAYS HAMMOND, JR.
BY Charles E. Mullan
THEIR ATTORNEY April 13, 1937.　　E. F. W. ALEXANDERSON ET AL　2,077,196
AIRPLANE LANDING FIELD USING DIRECTIONAL RADIO BEAMS
Filed Dec. 1, 1931　　6 Sheets-Sheet 4
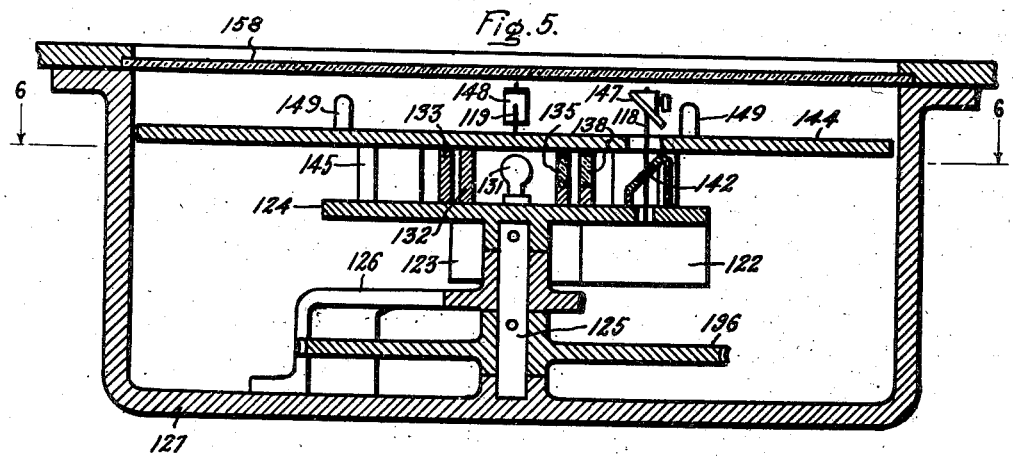
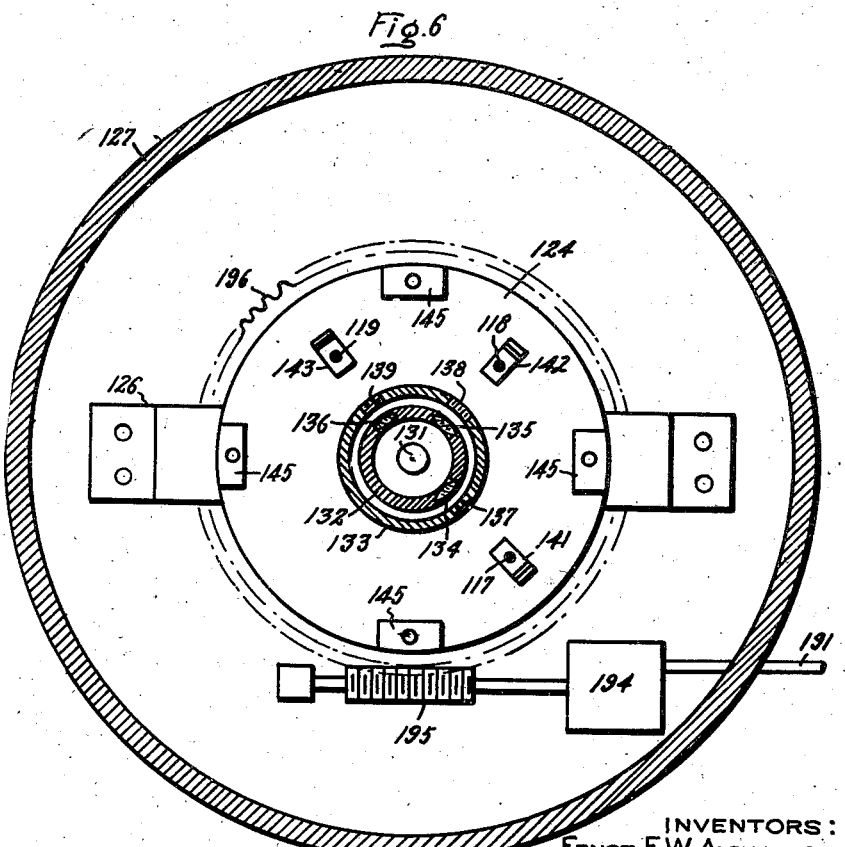
INVENTORS:
ERNST F. W. ALEXANDERSON,
JOHN HAYS HAMMOND, JR
BY
THEIR ATTORNEY

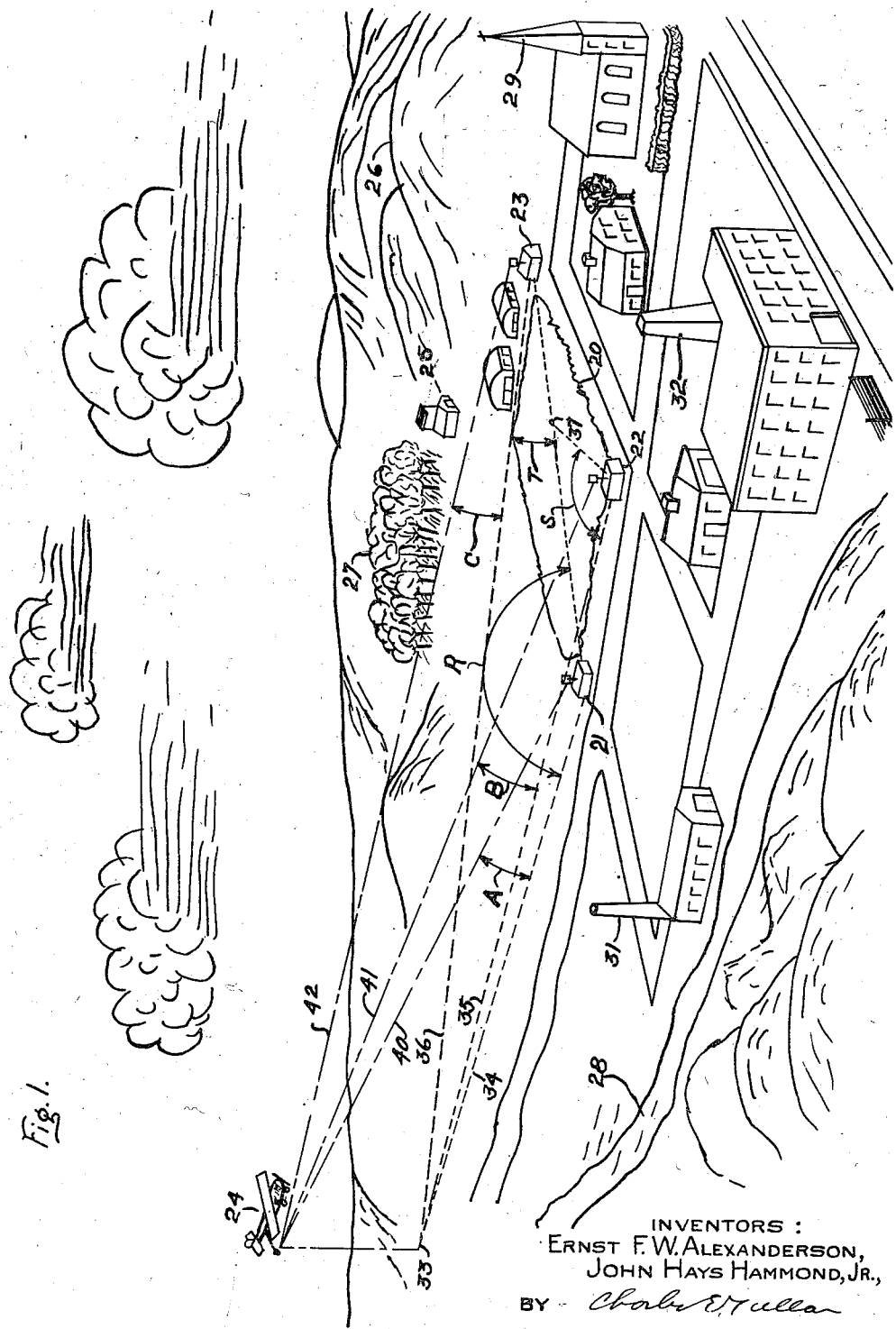

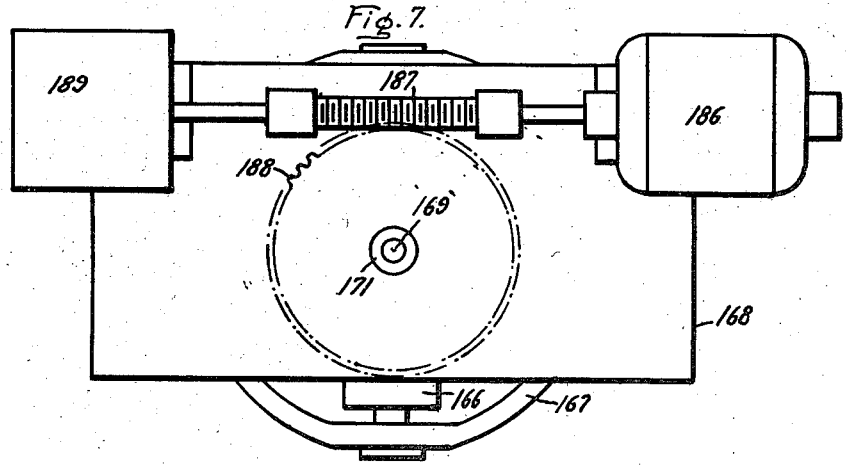
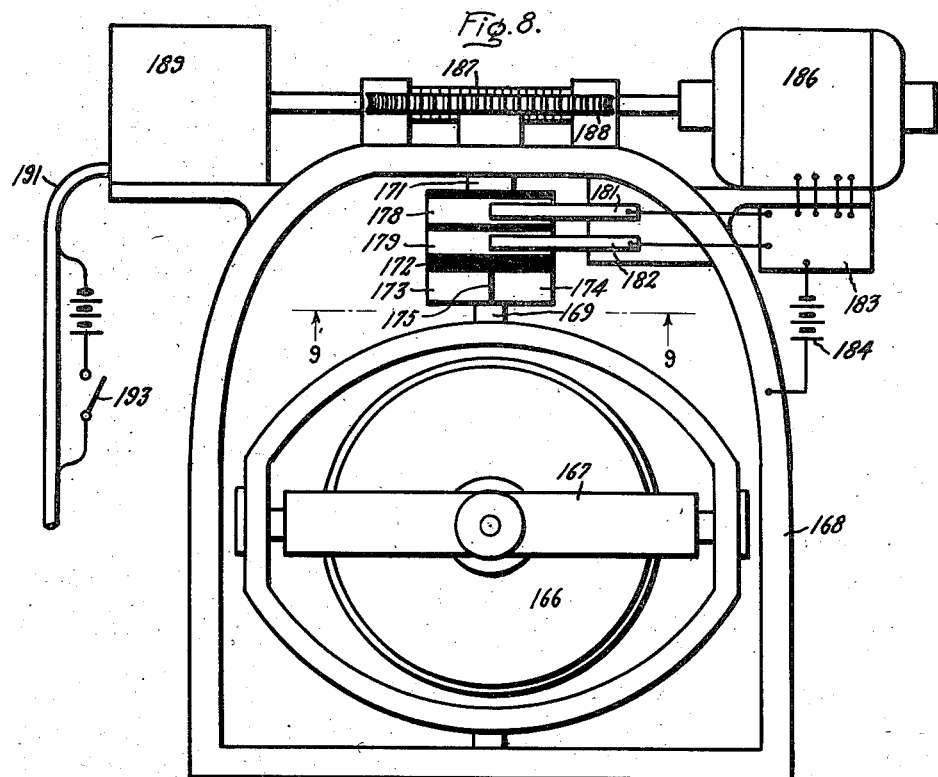
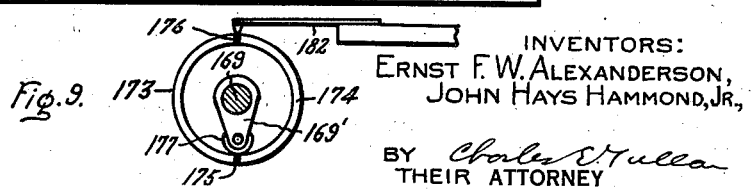
INVENTORS:
ERNST F. W. ALEXANDERSON,
JOHN HAYS HAMMOND, JR.,
BY Charles E. Tullar
THEIR ATTORNEY April 13, 1937. E. F. W. ALEXANDERSON ET AL 2,077,196
AIRPLANE LANDING FIELD USING DIRECTIONAL RADIO BEAMS
Filed Dec. 1, 1931   6 Sheets-Sheet 6

INVENTORS:
ERNST F. W. ALEXANDERSON,
JOHN HAYS HAMMOND, JR.,

BY *Charles E. Tullar*
THEIR ATTORNEY

Patented Apr. 13, 1937

2,077,196

UNITED STATES PATENT OFFICE 2,077,196

AIRPLANE LANDING FIELD USING DIRECTIONAL RADIO BEAMS

Ernst F. W. Alexanderson, Schenectady, N. Y., and John Hays Hammond, Jr., Gloucester, Mass., assignors to General Electric Company, a corporation of New York Application December 1, 1931, Serial No. 578,380

19 Claims. (Cl. 250—11)

Our invention relates to systems for guiding moving craft, and more particularly to systems for use at points of destination of craft to be guided whereby a craft approaching the point of destination from a distance may be accurately guided to a desired position.

While our invention has utility in connection with land, water, and aircraft, we contemplate its greatest utility in connection with landing fields for aircraft. One of the present most difficult problems in aeronautics is the provision of means to enable a pilot safely to approach an airport and to effect a landing during adverse weather conditions and particularly at times when the visibility of the pilot is impaired by fog.

One of the objects of our invention is to provide means on the craft responsive to differently located radiating systems on the ground for automatically producing a continuous indication of the position of the craft with reference to said radiating systems.

In accordance with our invention the craft to be guided is provided with a map, or chart of the geographical area including the port at which the landing is to be effected. On the chart may be marked such elements of the area as the obstructions which are to be avoided and the area in which a safe landing may be made. These markings may be made in a complete or suitably simplified way or if desired may be omitted, the boundaries of the chart itself being sufficient for the purpose. The craft is also provided with a plurality of signal receiving devices each of which is responsive to radiations transmitted from radiating systems suitably located about the port and each receiving device is adapted to produce an indication on the chart of the direction of the craft with reference to a corresponding radiation system. The indications of these devices are so coordinated that a particular point is indicated on the chart corresponding to the position or point of location of the craft in the designated area. The indicated point thus moves over the chart in accordance with the movement of the craft in the area designated by the chart.

Thus a further object of our invention is to provide means whereby indications of the type explained may be made upon the craft. A further object is to provide means whereby these indications may be given in an efficient, satisfactory and entirely automatic way.

Still a further object of our invention is to provide means whereby the desired indications are given by means of beams of light which are projected across the chart in such a way that they intersect at a point corresponding to the position of the craft in the designated area. When so employed the different beams of light may be suitably colored to produce a distinctive color at the point of intersection thereby rendering this point clearly discernible on the chart.

Still a further object of the invention is to provide means for so controlling the chart that the indicated point always moves in a single direction over the chart thereby facilitating the observations necessary to guidance of the craft.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings, in which Fig. 1 shows a bird's-eye view of a landing field equipped with our invention and the surrounding country;

Fig. 2 illustrates diagrammatically a circuit arrangement which may be employed in the radio beacon transmitters;

Fig. 3 illustrates diagrammatically receiving circuits which may be employed upon the aircraft;

Fig. 5 is a sectional view taken on line 5—5 of Fig. 4;

Fig. 6 is a sectional view taken on line 6—6 of Fig. 5;

Fig. 7 is a top plan view of the direction maintaining means;

Fig. 8 is a front elevation of same;

Fig. 9 is a sectional view taken on line 9—9 of Fig. 8;

Like reference characters denote like parts in the several figures of the drawings.

Figure 4:
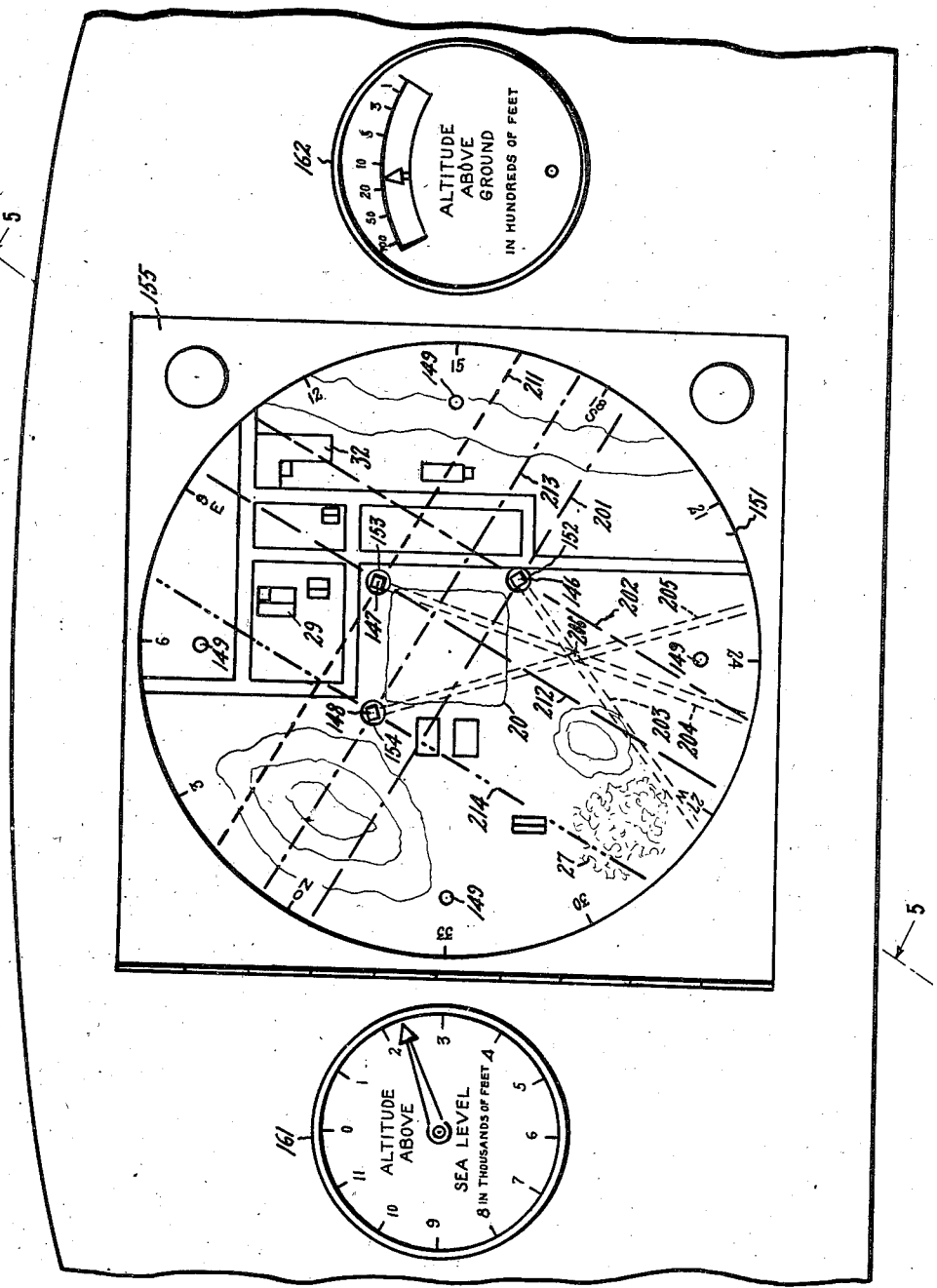
Fig. 4 is a front elevation of the instrument board on the aircraft.

In the following description and in the claims, parts will be identified by specific names for convenience, but they are intended to be as generic in their application to similar parts as the art will permit.

For purposes of illustration we have shown in Fig. 1, a landing field, as indicated at 20, having three radio beacon stations disposed about it as indicated at 21, 22 and 23. An approaching aircraft is shown at 24. We have also indicated in Fig. 1 other objects of the landscape about the landing field which are to be avoided by the pilot in approaching the field, such as a hill 26, forest 27, river 28, church steeple 29 and two tall chimneys 31 and 32. The projection of the airplane on the surface of the earth is indicated at the point 33. Joining this point, with the three radio beacon stations are three lines 34, 35 and 36, which form azimuth angles R, S, T, with lines drawn from the radio beacon stations to the center of the field 37.

The radio beacon stations 21, 22, 23 are provided with cross loop antennae of well-known form and construction whereby radio beams are transmitted in directions at an angle to each other all as will be more fully explained hereinafter. All these beacons are connected to a central station, not shown, from which high frequency energy is received for operation of the various antennae.

One form of generating equipment which may be employed at the central station is indicated in Fig. 2 and comprises a high frequency oscillator 41 which is connected through a transformer 42 to a plurality of pairs of conductors 43—44, 45—46, 47—48. These pairs of conductors extend to the different radio beacon stations 21, 22, 23 respectively. These stations may be equipped with identical apparatus so that only that used in connection with a single station as, for example, station 21, will be described. In this apparatus, the conductor 43 is connected to one end of a resistance 51, the other end of which is connected through a battery 52 to the filament circuits of two space discharge devices 53 and 54. The conductor 44 is also connected to the filament circuit of the discharge devices. The grids of the two space discharge devices 53 and 54 are connected to adjustable contacts 55 and 56 which engage the resistance 51. The plate circuits of the devices 53 and 54 are connected respectively to tuned circuits 57 and 58 which are coupled through transformers 59 and 61 to two sources of low frequency oscillations 62 and 63. The tuned circuits 57 and 58 are connected through batteries 64 and 65 to the two loops 66 and 67 which are mounted at right angles to each other on the top of the radio beacon station 21.

It will, of course, be understood that these circuit arrangements are shown and described purely for illustrative purposes since any desired means may be employed whereby a carrier wave of the same frequency may be radiated from both loops of all of the different radio beacon transmitters 21, 22, 23 and whereby the carrier wave radiated from each of the different loops of any station is modulated with oscillations having a frequency different from that of the other loop of the respective station and of the other stations. It will also be understood that while we particularly mention three radio transmitters our invention is not limited thereto since any different number of transmitters may be employed as desired.

The receiving equipment in the plane is diagrammatically indicated in Fig. 3 and consists of the usual antenna 71 and receiver 72 which may be of any well known type, such as those now commonly employed in connection with beacon signal reception. This receiver includes means for amplifying and detecting the carrier wave received from the different beacon stations 21, 22, 23 and for supplying to the output circuit thereof currents having frequencies corresponding to the different modulation frequencies of this carrier wave. Connected to this receiver are the usual form of head sets 73, used in this type of radio beacon. Also, connected in the output circuit of the receiver 72 are a plurality of transformers 74—79, the secondaries of which are shunted by condensers and form tuned circuits 81—86 tuned respectively to the different modulation frequencies. These tuned circuits are connected in the input circuits respectively of six space discharge means 91—96. The output circuits of these devices are connected through six reversing switches 101—106, to corresponding coils 111 to 116. These coils are arranged in pairs 111, 112; 113, 114; 115, 116 and the coils of each pair are mounted at right angles to each other on the shafts 117, 118 and 119, respectively, and are so located that they are between the pole pieces of corresponding permanent magnets 121, 122 and 123.

Each of the units consisting of the magnets 121, 122, 123, together with their associated coils, correspond respectively to one of the stations 21, 22, 23 and are employed in the manner presently to be described to control the directions of different beams of light across a map mounted on the instrument panel of the aircraft in accordance with the position of the aircraft and in such a way that the position of the craft is indicated by the point upon the map at which the three beams of light intersect.

Figure 10:
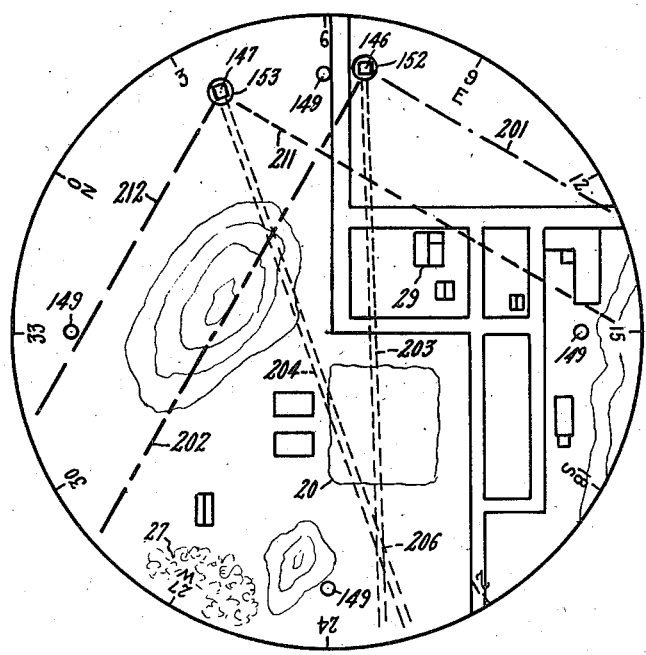
Fig. 10 illustrates a modification of the invention in which a different location for the radio beacon stations is employed.

The means whereby this result is brought about are shown in Figs. 5 and 6 in which is represented a casing 127 having a plate 144 supported therein and arranged to carry the map used for the guidance of the pilot. The plate 144 is supported from an additional plate 124 by means of spacer members 145. The plate 124 is mounted on the end of a vertical shaft 125 which is supported in bearings in the casing 127 and in a bracket 126. The plates 144 and 124 are thereby arranged for rotation within the casing for a purpose later to be indicated. The map may be held in position on plate 144 in any suitable way as by pins 149 projecting through holes therein, as indicated in Figs. 4 and 10, and has indicated thereon the geographical nature of the region surrounding the airport and the position of obstructions which are to be avoided by the pilot.

Also mounted on the plate 124 is a source of illumination 131 which is arranged preferably at the center of the plate and within two concentric cylindrical casings 132 and 133. In the casing 132 are mounted three lenses 134, 135 and 136, and in the casing 133 are three colored glass windows 137, 138 and 139 disposed in alignment with the lenses 134, 135, and 136. In line with the lenses 134, 135 and 136 are three inclined mirrors 141, 142 and 143 which are provided with holes through which project the shafts 117, 118 and 119 respectively of the units 121, 122 and 123 described in connection with Fig. 3, these units being mounted on the under side of the plate 124, as indicated at 122 in Fig. 5. The shafts 117, 118 and 119 also project through three holes in the plate 144 and carry at their upper ends additional inclined mirrors 146, 147 and 148 (Figs. 4 and 5). These additional mirrors are each arranged to receive light from the source 131 after reflection from the corresponding inclined mirror mounted on the plate 124 through the holes in plate 144, and to reflect beams of light across the map in a direction determined by the position of the shafts 117, 118 and 119 upon which the respective mirror is mounted. By proper adjustment of the equipment these beams of light reflected from the mirrors 146, 147, 148 are made to intersect at a point corresponding to the position of the craft. The pilot may then observe the movement of this point of intersection and thereby receive a continuous indication of the position of his craft.

If desired the three beams of light may have the colors red, green, and blue respectively thereby producing a white spot at the point of intersection of the three beams. Of course other colors may be used if desired. In this way the point of intersection of the different beams can be more readily observed and followed by the pilot. The casing 127 is enclosed at the top by a plate of glass 158 suitably secured to the casing.

Located adjacent to the panel 155 as shown in Fig. 4 are two altimeters 161 and 162, the former being of well-known and standard construction and the latter being of the radio echo type such as that developed by Dr. E. F. W. Alexanderson and described in "Science and Invention" for February 1929, pages 952 and 953. The former gives the altitude of the plane above sea level, and the latter gives the altitude above the ground and is much more accurate, being calibrated so that the aviator can tell his height above the ground within a few feet.

In the operation of the system described it is desirable that the point of light, at the intersection of the three beams move only in a vertical or forward direction dependent upon the mounting of the chart as the craft approaches the landing position, thereby additionally facilitating the observation and use of the instrument. For this purpose, in accordance with our invention, means are provided whereby the map, together with the reflecting mirrors 146, 147, and 148 and other equipment mounted on plate 124, are rotated in response to turning of the craft and by amounts just sufficient to cause the desired movement of the spot of light in a straight line only.

For this purpose a directional gyroscope, as indicated in Figs. 7 and 8, is employed. This gyroscope may be located at any desired point on the craft and operates through remote control equipment indicated at 189 in Fig. 8 and 194 and 195 in Fig. 6 to rotate the map in accordance with any turning of the craft.

This unit consists essentially of a rapidly rotating gyroscopic element 166 which is mounted in gimbals 167 in a frame 168. The vertical shaft 169 of the gimbal mounting is rotatably mounted in a sleeve 171 which in turn is rotatably mounted in the frame 168. Secured to the lower end of the sleeve 171 is a cylindrical member 172 made of insulating material. Secured to the lower face of the member 172 are two semi-circular conducting segments 173 and 174 separated by strips of insulation 175 and 176 (Fig. 9). Secured to the shaft 169 within the segments 173 and 174 is an arm 169', shown in Fig. 9, on the outer end of which is rotatably mounted a roller 177 which engages the inner surface of the segments 173 and 174.

Also mounted on the insulating member 172 are two slip rings 178 and 179 which are electrically connected respectively to the two segments 173 and 174, and upon which rest two brushes 181 and 182 which are connected to the relays of a reversing mechanism contained in a casing 183. The roller 177 is electrically connected through the shaft 169 to the frame 168 and to battery 184. When the craft is proceeding straight ahead this roller rests on the insulation 175 but in response to any turning of the craft to the right or left the roller engages the corresponding segment 173, or 174, and thereby completes an appropriate circuit through battery 184, frame 168, shaft 169, roller 177, segment 173 or 174, as the case may be, and the corresponding ring 178, 179 and brush 181, 182 back to suitable control relays, not shown, in the reversing mechanism. The reversing mechanism may be of any suitable type well known in the art whereby the direction of rotation of motor 186 is controlled in accordance with the segment 173, 174 with which the roller 177 engages. In this way the motor is always rotated in a direction corresponding to the direction of turn of the craft.

Secured to the shaft of motor 186 is a worm 187 which meshes with a worm wheel 188 which is secured to the sleeve 171 thereby to rotate the member 172 and segments 173 and 174 in a direction tending continuously to maintain the roller 177 on the insulation 175 thereby interrupting the control circuits of the reversing mechanism.

In this way the shaft of the motor is rotated in accordance with the direction of turn of the craft and by an amount dependent upon the extent of the turn. By means of a suitable position transmitting mechanism the rotation of the shaft of the motor may be transmitted to the shaft 125 upon which the map carrying plate 144 is mounted. For this purpose any suitable position transmitting mechanism, such for example as the induction device, known as the Selsyn, or a device described in United States Patent 1,431,140 to John Hays Hammond, and indicated in Figs. 18, 19, 20 and 21 thereof, may be employed. The position sender of this system may be arranged on the motor shaft as indicated at 189 in the drawings and connected by the conductors of the cable 191 to the position receiver 194 arranged in the casing 127 housing the map. This receiver controls the rotation of a worm 195 which meshes with a worm gear 196 mounted on the shaft 125. Thus the shaft 125 and accordingly the map is rotated in accordance with any turning of the craft.

Of course, the operation of the position transmitting system may be interrupted in any desired way as by a switch 193 in the circuit interconnecting the transmitter and receiver.

Figure 11:
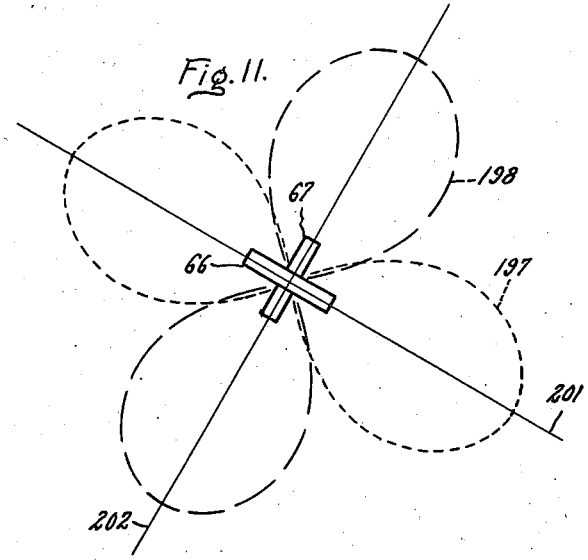
Fig. 11 indicates diagrammatically the strength of the radio signals radiated from the beacon in various directions.

In the operation of the form of the invention shown in the accompanying figures, the oscillator 41 produces high frequency currents which are transmitted over the conductors 43 and 44 to the input circuits of the space discharge means 53 and 54. The amount of energy supplied to these discharge devices is determined by the settings of the adjustable contacts 55 and 56. The output of each space discharge means 53 and 54 is modulated by the oscillators 62 and 63 so that the energy radiated by the two loop antennae 66 and 67 consists of high frequency oscillations of the frequency produced by the oscillator 41 modulated by the oscillators 62 and 63 respectively. This energy is radiated from these two antennae in a well-known manner, the curve of radiation being shown in Fig. 11 in which the radiation curve for the antenna 66 is shown by the dotted line 197, and the energy radiated by the antenna 67 is shown by the broken line 198. It is thus seen that the signal strength for any position around this antenna will consist of two components, that radiated by antenna 66, and that radiated by antenna 67. When the receiver is in the same plane as antenna 66 it will receive maximum energy from this antenna and none from the antenna 67, and when at right angles to this plane, it will receive maximum energy from the antenna 67 and none from the antenna 66. For any intermediate position, the relative intensities of the two energies received will be dependent upon the angular distance between the extreme positions.

Thus, as the plane approaches the field, the six signals from the three radio beacon stations 21, 22 and 23 will be received by the antenna 71. This energy is amplified by the receiver 72, the output of which passes through the transformers 74—79. The tuned circuits 81—86 then separate the six modulation frequency currents. These are then amplified and detected and the output direct current made to pass through the reversing switches 101—106 to the coils 111—116. The currents in the coils 111 and 112 correspond to the energy received from the antennae 66 and 67 and, therefore, these currents will be dependent on the position of the craft with respect to the two planes of these antennae. The direction of these planes is shown on the map in Fig. 4 by means of the dash-dot lines 201 and 202. The position assumed by the shaft 117 carrying mirror 146 will correspond to the angle formed by the line drawn from the plane to the radio beacon, and the line 201, as the currents flowing in these two coils will be proportional to this position as already described and, therefore, these coils will take up a position in the magnetic field of the magnet 121 corresponding to the strength of the currents passing through them. Thus, for example, if the plane were approaching the beacon along the line 201 it would be in the plane of the antenna 66 and, therefore, would receive maximum energy from this antenna and none from the antenna 67. This would cause a maximum current to flow through the coil 111 and none through the coil 112. The coil 111 would then take up a position perpendicular to the lines of magnetic force, passing between the pole pieces of the magnet 121 and the coil 112 take up a position parallel to these lines.

If the plane were approaching along the line 202, no energy would be received from the antenna 66, and maximum energy would be received from the antenna 67 so that the coil 112 would now place itself perpendicular to the magnetic field and the coil 111 would become parallel to it. It is thus seen that the shaft 117 will be turned through an angle which corresponds to the position of the airplane with respect to the beacon 21. In this way the mirror 146 is caused to reflect its beam of light over the map in a direction corresponding to the direction of the craft from the respective beacon.

As long as the craft keeps in one quadrant limited by the lines 201 and 202, the beam of light controlled by this shaft gives the angular position of the airplane with respect to the beacon, but when the plane crosses one of these lines such as 201 for example, it is necessary to reverse the direction of the current flowing through the corresponding coil 112 which at that time is carrying no current and is parallel to the lines of magnetic force. This can be done by throwing the reversing switch 102 which reverses the direction of the current flowing through this coil so that as the plane proceeds upon the other side of this line, the shaft 117 assumes the proper position to indicate the angular position of the craft with respect to the beacon 21.

It is thus seen that as the plane approaches the landing field each of the shafts 117, 118 and 119 assumes an angular position corresponding to the location of the craft with respect to the three beacons 21, 22 and 23. The rotation of the three shafts and their corresponding mirrors 146, 147 and 148 therefore throw their three beams of different colored lights 203, 204 and 205 each in a direction toward the position on the map corresponding to the position of the craft. The point of intersection 206 will, therefore, be the location of the projection of the airplane with respect to the landing field 20. Thus as the plane approaches this field, the three shafts 117, 118 and 119 turn the mirrors 146, 147 and 148 so that the beams of light 203, 204 and 205 follow the position of the craft with respect to the radio beacons and, therefore, their moving point of intersection continuously indicates the position of the craft as it approaches the field.

As already described, when the craft crosses the plane of one of the loops, it is necessary to reverse the current passing through the coil at right angles to this line. To indicate to the aviator when it is necessary to do this, the map 151 is provided with lines passing through the radio beacons and indicating the planes of the loops of these beacons. These lines are indicated on the map at 201 and 202 for the beacon 21, 211 and 212 for the beacon 22, and 213 and 214 for the beacon 23. These lines may be printed in different colors and the handles of the corresponding reversing switches 101—106 may be marked by the same color so that as the aviator is watching his approach to the landing field, it will be a simple matter for him to throw the proper reversing switch at the instant that he sees his plane is crossing one of these lines. It is, therefore, a comparatively simple matter for the aviator to watch his approach to the landing field. By noting his altitude as indicated by the meter 162 he can tell what height he is above the ground, so it is thus possible for him to make a landing without seeing the ground, as for example, during a fog or at night.

In order to avoid the necessity of using the reversing switches, it is possible to locate the radio beacons at a considerable distance from the landing field so that the planes of their loops do not pass within say a quarter of a mile of the field. In this way it is possible for a plane arriving at the field to keep in a single quadrant of the radio beacons, thereby avoiding any changing of the reversing switches while the aviator is making a landing. Further this system may be used in connection with a standard radio course beacon which would direct the plane in a well-known manner to within a comparatively short distance of the field. The aviator may then switch on his indicator which, in this case, is similar to that already described. In this case, however, two radio beacons would probably prove to be sufficient as the plane would not be apt to cross the line joining these two and, therefore, a third station would be unnecessary.

In Fig. 10 is shown a map of this latter type of landing field with the mirrors 146 and 147 placed at a considerable distance from the landing field 20 corresponding to the new locations of the beacons 21 and 22. The rest of the apparatus is similar to that already described except that the indicators are moved to the new positions to correspond with those shown in the figure. This system operates as already described, the advantage being that the craft in making a landing on the field 20 would not have to pass over any of the lines 201, 202, 211 or 212 so that the pilot would not have to throw the reverse switches, but could devote all his time watching the progress of the plane as shown on the map.

A clearer understanding of the effects produced by gyroscopic control of the chart may be had by considering specific illustrations.

It is desirable if the chart be mounted vertically that the spot of light always move upward on the chart, as the craft approaches the landing position, or if it be mounted horizontally as, for example, ahead of the pilot, it is desirable that the spot of light always move forward as the craft approaches the landing position independently of the direction from which the craft approaches. To accomplish this and at the same time to cause the spot of light always to indicate on the map the true position of the craft with reference to the port, it is necessary initially correctly to orient the map with reference to true north. This, of course, can be effected in any desired way.

Let us assume that the map is mounted horizontally ahead of the pilot and that the craft is approaching the landing position from due north. North is then at the near side of the map. The craft then approaches in a straight line and lands. The gyroscope, of course, does not respond and accordingly no movement of the map occurs. The spot of light merely moves directly forward in a straight line, continuously indicating the position of the craft. The same movement of the spot of light from the near side of the chart forward occurs when the craft approaches the landing field from due south, or from any other direction. If it approaches from the south, however, north is at the far side of the chart, or if it is approaching from the east, or west, north is at the corresponding side of the chart. Accordingly, the spot of light always indicates the true position of the craft with reference to the port.

Now let us assume that the craft is flying directly south so that north is indicated at the near side of the chart but that the spot of light first appears at the right of the chart thereby indicating that the craft is directly west of the landing position. The craft then immediately turns east thereby turning through an angle of ninety degrees. The gyroscope responds to the turn and the chart is rotated through ninety degrees so that the north is now indicated at the left of the chart and west at the near side. The spot of light now appears at the near side of the chart and as the craft approaches the landing position moves forward in accordance with the instant point of location of the craft.

But let us suppose in the last example that the pilot has orders to enter the landing position from due south. He then turns east at a point southwest of the airport. The point of light then appears at the near right-hand side of the chart and moves forward along the right side of the chart as the craft flies east. When the craft is due south of the port, it turns north. The spot of light now again appears at the center of the near side of the chart and moves forward as the craft approaches the landing position.

Had the pilot had orders to enter the landing position from the southwest he would have turned directly toward the landing position at a point southwest of the port. The point of light would then have appeared at the center of the near side of the chart and moved forward as the craft approaches the port.

Thus neglecting the effects of drift the spot of light always moves forward or longitudinally of the craft, or vertically if the chart be mounted vertically; and appears at a lateral position on the chart corresponding to the lateral position of the craft with respect to the port.

While we have shown only particular embodiments of our invention it will, of course, be understood that we do not wish to be limited thereto since many modifications, both in the circuit arrangements and in the instrumentalities employed, may be made and we contemplate by the appended claims to cover all such modifications as fall within the true spirit and scope of our invention.

What we claim as new and desire to secure by Letters Patent of the United States is:—

1. In a system for guiding moving craft in a certain geographical area, a chart of said area carried by the craft, a plurality of radiating systems arranged at different geographical locations in said area, each of said radiating systems including means to produce an equi-signal radiation along a predetermined path in said area, and means on the craft uniformly sensitive to energy received from all directions and responsive to all of said radiating systems to indicate a point moving over said chart in accordance with the movement of the craft over said geographical area.

2. In a system for guiding moving craft in a certain area, a plurality of radiating systems in said area, each of said radiating systems including means to produce a radiation continuously during the period when a moving craft is guided, said continuously produce radiation having a distinctive character in a particular direction, a chart of said area carried by the craft having the positions corresponding to said radiating systems indicated thereon, and means on the craft controlled by each of said radiating systems and equally sensitive to energy received from all directions for indicating on the chart, in response to said radiations continuously received, the bearing of said craft with respect to the respective radiating system, and means whereby said means indicate a point moving over said chart in accordance with the movement of said craft in said area.

3. In a system for guiding moving craft, the combination of a plurality of radiating systems having different geographical locations, each of said radiating systems transmitting different signals in a plurality of directions whereby equisignal zones are produced in a region between said directions, and means on the craft for producing a plurality of responses, each of said responses corresponding to the position of the craft relative to an equisignal zone produced by a respective radiating system, and means to coordinate said responses to produce an indication of the geographical point of location of said craft.

4. In a system for guiding moving craft, the combination of a plurality of continuously radiating directive radiating systems having different geographical locations, each of said radiating systems producing radiation patterns which overlap throughout the region in which craft are to be guided, the radiation from each radiating system being of different character in different directions, said different characters of said radiations being produced while said radiations are free from interruptions, a plurality of receiving means on the craft having a common non-directive receiving antenna, each of said receiving means being arranged to respond to radiations from a corresponding radiating system to indicate the direction of the craft from the respective radiating system, and means for so coordinating the indications of said means that a continuous indication of the point of location of the craft with reference to said radiating systems is produced.

5. In a system for guiding moving craft to a port, a plurality of radiating systems arranged about said port in different geographical locations, means included in each of said radiating systems to produce a distinctive radiation in a particular direction, and different character radiations in other directions, said directions being in the horizontal plane and said radiations being produced continuously during the time when a craft is to be guided, and means on the craft responsive to the said radiations produced continuously by the different radiating systems to indicate the point of location of the craft with reference to said port.

6. In a system for guiding moving craft to a port, a plurality of radiating systems arranged about said port in different geographical locations, means included in each of said radiating systems to define a course leading to the respective radiating system and to produce continuous distinctive radiations free from interruptions on opposite sides of said course, said radiations extending over a common region including said port, a plurality of receiving means on said craft, each of said receiving means being responsive to the distinctive radiations received without interruptions therein from one of the radiating systems to indicate the direction of the craft with reference to the corresponding system, and means for coordinating the indications produced by the different receiving means to indicate the location of said craft relative to said port.

7. In a system for guiding moving craft, in a certain geographical area, a chart of said area, and means for projecting a plurality of beams of light across said chart from predetermined points thereon in directions corresponding to the direction of said craft from fixed points in said area, whereby the point of intersection of said beams of light corresponds to the instant position of the craft, said means comprising means including a plurality of radiation systems located respectively at said fixed points, each of said radiating systems including means to produce a continuous radiation, said radiation having a distinctive character in a particular direction and means for controlling each beam of light in response to the continuous radiation from a corresponding radiating system to cause said point of intersection of said beams of light to move across said chart in accordance with the movement of said craft across said area.

8. In a system for guiding moving craft to a port, a plurality of beacons located about said port, each of said beacons being arranged to project characteristic signals in each of two different directions whereby an equi-signal area is produced in a direction intermediate said two directions, a plurality of equi-signal receiving devices on the craft, each of said equi-signal receiving devices corresponding to one of said beacons, and arranged to produce an indication of the direction of the craft from the respective beacon, and means for so coordinating said indications as to indicate a point corresponding to the instant position of the craft.

9. In a system for guiding moving craft to a port, a chart of the area including said port arranged on the craft, a plurality of beacons located about said port, each of said beacons being arranged to radiate characteristic signals in each of two different directions whereby an equi-signal area is produced in a direction intermediate said two directions, a plurality of equi-signal receiving devices, each of the receiving devices corresponding to one of said beacons, and each receiving device being arranged to project a beam of light across said chart in a direction corresponding to the instant direction of the craft from the respective beacon whereby said beams of light intersect at a point on said chart corresponding to the instant position of the craft in said area.

10. In a system for guiding moving craft to a predetermined position in a certain geographical area, a chart of said area, a plurality of directive radiating systems disposed about said predetermined position, means responsive to radiation produced by said directive radiating systems for continuously indicating on the chart the bearings of the craft with reference to each of said radiation systems, whereby a point is indicated on the chart corresponding to the instant position of the craft with reference to said radiating systems, and means for so controlling the chart that said point moves over the chart in a single direction with respect to the craft when the craft approaches said predetermined position from any direction.

11. In a system for guiding moving craft over a certain geographical area, a plurality of continuously radiating directive radio transmitters disposed within said area at predetermined positions, each of said directive radio transmitters producing a continuous distinctive radiation in a particular direction, a pictorial representation of said area carried by said craft, means located upon said pictorial representation at positions corresponding to the positions of said radiating systems for continuously indicating by a point on said pictorial representation the instant position of said craft with respect to said area and radiating systems, means uniformly sensitive to energy from all directions for receiving the radiations produced by said directive radio transmitters and for continuously controlling said indicating means, and means for maintaining said pictorial representation oriented with respect to north independently of any turning of said craft whereby at any instant a view of said pictorial representation is a representation in similitude of said geographical area viewed from the craft.

12. In a system for representing pictorially a geographical area as though viewed from a craft moving over said area and the instant position of said craft within said area, a plurality of continuously radiating directive systems having different locations within said area, each of said directive radiating systems producing distinctive continuous radiations in two particular directions whereby an equi-signal area is produced in a direction intermediate said directive radiations, means on said craft responsive to said equi-signal radiations produced by said radiating systems for continuously indicating the instant position of said craft by light beams upon the pictorial representation of said geographical area, and means for maintaining said pictorial representation oriented with respect to north independently of any turning of the craft.

13. In a system for guiding moving craft to a port, a plurality of geographically separated radio beacons located about said port, each of said radio beacons including means continuously to produce distinctive radiations on opposite sides of a course leading to the respective beacon, said radiations extending over a common region including said port and being free from interruptions, radio receiving means equally sensitive to energy received from all directions located on said craft and including a plurality of means each selectively responsive to the distinctive characteristics of the radiations received without interruptions therein from a particular beacon to indicate the direction of the craft with reference to said beacon, and means for coordinating said responses to indicate the point of location of said craft with reference to said beacons.

14. In a system for guiding moving craft to a port, a plurality of transmitters arranged about said port, each of said transmitters including a plurality of energy radiating means, each of said means being adapted to produce a radiation having a distinctive characteristic in a direction different from the radiating directions of the other means of the same transmitter, receiving means located on said craft responsive to the radiation from each of said transmitters, said receiving means including means for producing indications corresponding to the direction of the craft with reference to each of said transmitters, and means for coordinating the indications of said last named means to indicate the point of location of said craft with reference to said transmitters.

15. In a system for guiding moving craft to a port, the combination of a plurality of continuously radiating radio beacons located about and out of the area of said port, each beacon including means for producing distinctive radiations in different directions, the distinctive radiations of each beacon overlapping over the region traversed by the craft in approaching the port, a plurality of indicating means on the craft, each of said means being selectively responsive to one of said radio beacons and arranged to receive energy from the respective beacon continuously, and means including said indicating means whereby a continuous indication of the point of location of said craft is made as the craft approaches and passes within said port.

16. In a system for guiding craft to a port, a plurality of course beacons about said port, means included in each of said course beacons to produce continuously and free from interruptions energy radiations defining a different course, a plurality of indicating means on the craft, each of said indicating means responding selectively to the energy radiations free from interruptions from one of said beacons to indicate the direction of the craft with respect to said beacon, and means to coordinate the indications produced by said last means to indicate the point of location of said craft with respect to said port.

17. In a system for guiding moving craft to a port, a plurality of equi-signal course beacons about said port, each beacon being adapted to produce a plurality of distinctive energy radiations in different directions, and each beacon producing radiation in a common region in which craft are to be guided, a plurality of beacon responsive devices on said craft, each of said devices being responsive to the energy radiations from one of said beacons to indicate the direction of said craft relative to said beacon, and means including said beacon responsive devices to indicate the point of location of said craft relative to said port.

18. In a system for guiding moving craft to a port, a plurality of radiating systems arranged about said port adapted to produce a plurality of distinctive overlapping energy radiations defining a plurality of non-coincident equi-signal courses, energy radiation receiving means located on said craft including a plurality of means, each of said means being selectively responsive to the distinctive energy radiations from a particular radiating system and being adapted to indicate the direction of said craft with reference to said station, and means to coordinate the indications of said last named means to indicate the location of said craft relative to said port.

19. In a system for guiding moving craft to a port, a plurality of radiating systems arranged about said port for producing overlapping energy radiations, each radiating system being adapted to produce a plurality of distinctive energy radiations defining an equi-signal course non-coincident with the equi-signal courses defined by the energy radiations from the other radiating systems, energy radiation receiving means located on said craft including a plurality of means, each selectively responsive to the radiations from a particular radiating system and adapted to indicate the direction of the craft with reference to said radiating system, and means to coordinate the indications of said last named means to indicate the point of location of said craft with reference to said port.

ERNST F. W. ALEXANDERSON.
JOHN HAYS HAMMOND, JR.